Nov. 29, 1955 J. S. MURRAY 2,725,427
TRUNKING ARRANGEMENT FOR TELECOMMUNICATION SYSTEM
Filed May 3, 1952 10 Sheets-Sheet 1

INVENTOR
J. S. MURRAY
BY T. L. Bowes
ATTORNEY

Nov. 29, 1955 J. S. MURRAY 2,725,427

TRUNKING ARRANGEMENT FOR TELECOMMUNICATION SYSTEM

Filed May 3, 1952 10 Sheets-Sheet 2

INVENTOR
J. S. MURRAY
BY T. L. Bowes
ATTORNEY

INVENTOR
J. S. MURRAY
BY T. L. Bowes
ATTORNEY

TRUNKING ARRANGEMENT FOR TELECOMMUNICATION SYSTEM

INVENTOR
J. S. MURRAY
BY T. L. Bowes
ATTORNEY

INVENTOR
J. S. MURRAY
BY T. L. Bowes
ATTORNEY

Nov. 29, 1955 J. S. MURRAY 2,725,427

TRUNKING ARRANGEMENT FOR TELECOMMUNICATION SYSTEM

Filed May 3, 1952 10 Sheets-Sheet 6

INVENTOR
J. S. MURRAY
BY T. L. Bowes
ATTORNEY

TRUNKING ARRANGEMENT FOR TELECOMMUNICATION SYSTEM

Filed May 3, 1952 10 Sheets-Sheet 7

INVENTOR
J. S. MURRAY
BY T. L. Bowes
ATTORNEY

Nov. 29, 1955 J. S. MURRAY 2,725,427

TRUNKING ARRANGEMENT FOR TELECOMMUNICATION SYSTEM

Filed May 3, 1952 10 Sheets-Sheet 8

INVENTOR
J. S. MURRAY
BY T. L. Bowes
ATTORNEY

TRUNKING ARRANGEMENT FOR TELECOMMUNICATION SYSTEM

Filed May 3, 1952 10 Sheets-Sheet 9

INVENTOR
J. S. MURRAY
BY
T. L. Bowes
ATTORNEY

Nov. 29, 1955 J. S. MURRAY 2,725,427

TRUNKING ARRANGEMENT FOR TELECOMMUNICATION SYSTEM

Filed May 3, 1952 10 Sheets-Sheet 10

INVENTOR
J. S. MURRAY
BY
T. L. Bowes
ATTORNEY

United States Patent Office 2,725,427
Patented Nov. 29, 1955

2,725,427

TRUNKING ARRANGEMENT FOR TELECOMMUNICATION SYSTEM

James S. Murray, Tampa, Fla., assignor, by mesne assignments, to General Dynamics Corporation, a corporation of Delaware Application May 3, 1952, Serial No. 285,910

12 Claims. (Cl. 179—18)

This invention relates to telecommunication systems and particularly to trunking arrangements involving several classes of service, such as local service and toll service.

The object of the invention is to promote economy through the greater use of existing facilities. It appears that with the advent and rapid growth of toll dialing the trunking facilities between distant exchanges is becoming crowded at a faster rate than new circuits can be provided. It appears also that the peak of toll traffic does not coincide with the peak of local traffic and since sufficient trunking facilities must be provided to care for these peak load conditions there is an overlapping traffic pattern such that a sum total of toll and local trunk requirements is less than the sum of peak load toll needs plus the peak load local needs. Applicant therefore provides a switching arrangement whereby a certain number of trunks may be shared. Merely by way of example, it may be supposed that the peak load of toll traffic between two exchanges will require six trunks and the peak load of local traffic may require ten trunks—a total of sixteen. However, by use of the switching arrangement of the present invention, three trunks may be reserved for the exclusive use in toll service, seven trunks for exclusive use in local service and three trunks to be shared between the two services—a total of thirteen or a saving of three.

In accordance with the present invention certain switching facilities are provided whereby these three shared trunks, normally connected through for local service are instantly convertible where toll demands are paramount. By way of example, when the first toll trunk is appropriated, the existing arrangements are left undisturbed but when the second toll trunk is appropriated leaving but one idle and ready for use, then the fourth is switched over and made ready for toll use, at the same time this fourth trunk being barred to local access. In like manner when the third toll trunk is seized then through this act of seizure the fifth trunk is switched over and made ready for toll use. If either this fourth or fifth trunk is being used in local traffic at the time of the seizure of the second or third trunk respectively the local connection will not be disturbed, but the instant such local use is relaxed the trunk will be switched over to toll working.

The switching arrangements are such that these shared trunks appear in the toll selector banks to be busy and hence they cannot be seized until each has been switched over by the appropriation of a preceding trunk. If, as hereinbefore stated, such a preceding trunk is seized but this (companion) trunk is being used in local service, the artificial busy marking will be maintained until the trunk is released. When any one of these shared trunks is switched over to toll service it is immediately marked busy in the local selector banks. The principle of the invention thus stated and explained by one specific example is capable of wide variation and may be adapted to conform to many traffic patterns with the result that a smaller number of trunks may be employed to serve a total larger requirement in any given and unique pattern.

A feature of the invention is a trunk line extending between two distant exchanges terminating at each end in switching facilities sensitive to a swelling volume of a given class of traffic to convert the said trunk from conditions suitable to another form of traffic to the impending type of traffic to and for which it may shortly be appropriated. A given number of trunks are reserved for exclusive use in the said given class of traffic and another given number of trunks are arranged to be converted to this given class of traffic as the busy condition of the said exclusive trunk approaches completion; in other words, arrangements are provided whereby a certain number of trunks either exclusive or shared are always maintained in readiness for use in this said given class of traffic. As exhaustion of the exclusive trunks is approached, more and more of the shared trunks are taken out of the said other type of service and readied for the said given type of service.

In accordance with the above feature the said switching arrangement is responsive to the seizure of one trunk to prepare another trunk further on in order for service. This said other trunk is normally marked as busy but while so marked may be appropriated to a different service. However, when the said switching arrangement operates it is rendered unavailable to this said different service and the normal busy marking for its paramount service is removed, thus rendering it available before its use is sought in this paramount service.

Another feature of the invention is a switching arrangement for converting a trunk to availability for paramount service but which may be prevented from operation if the trunk at the time is busy in a subordinate service. The condition of the switching arrangement is maintained, however, so that the instant the trunk is released from this subordinate service it may be freed of the busy marking and converted to readiness for the said paramount service.

Another feature of the invention is a means for accelerating the process of placing the shared trunks in condition for the paramount service. As the call for this service begins to increase the shared trunks are barred from the subordinate service first at a slow rate and as the peak demand is approached they are appropriated more rapidly. Thus, the last in order of the shared trunks may be taken for the paramount service by the act of appropriation of a preceding trunk. As a specific example, the act of appropriating the fifth toll trunk, also appropriates the sixth. Thus, when the third toll trunk goes into actual service, the fifth trunk is readied and in accordance with the present feature the readying of the fifth also causes the sixth to be readied. By the provision of other simple means this feature may be extended so that the readying of any one of several trunks by the actual seizure in service of preceding order trunks will automatically ready a succeeding trunk. Thus in a specific example, when either the fourth trunk, readied when the second trunk is seized in service or the fifth trunk, readied when the third trunk is seized in service, will result in readying the sixth trunk.

Another feature of the invention is the terminal arrangement of an interoffice trunk whereby the trunk at either end thereof, normally adapted for local service may be readied for toll service. If readied at one end for toll service and then seized for such toll service while still adapted to local service at the far end, the incoming selector thereat will nevertheless extend the toll connection either to a local connection at said distant end or to a toll line leading therefrom. In one embodiment of the invention there is provided a local circuit arrangement and a toll circuit arrangement at each end of the interoffice trunk. Normally the local circuit arrangement is connected to the trunk and this includes a connection to an incoming selector. When, however, the trunk is readied for toll service a toll circuit arrangement is connected to the trunk in substitution for the said normal local circuit arrangement and this toll circuit also includes an incoming selector, the two said incoming selectors both having access to the same outlets.

Another feature of the invention is the use of a single or common incoming selector for both the toll and local circuit arrangements at one end of the interoffice trunk. The same switching means employed to switch one end of the trunk from a local circuit arrangement to a toll circuit arrangement also switches the common incoming selector from one to the other.

Another feature of the invention is an alternative circuit arrangement employed in situations where the current value on a control conductor might be of a critical value. When one of the said shared trunks is seized in local service, the signal used to mark it as busy must also be used to prevent it being readied for toll service and since this requires a positive signal which in some cases might interfere with the said normal busy signal condition, an extra relay of a comparatively high resistance value is employed to produce the said positive signal. Thus the sleeve or control lead of the local circuit arrangement is normally connected to a battery circuit including a resistance of a given value, whereby when the local circuit is seized, this battery connection is short-circuited to render a relay winding connected also to this point from being effectively energized. Since there may be situations where critical current values obtain, this sleeve or control point is connected, not to the said battery connection but rather to a comparatively high resistance relay winding which will have no adverse effect upon other connections to the said sleeve or control point.

Another feature of the invention is a means for simultaneously switching the distant ends of a trunk line by selective means at each end thereof and without the use of any signal being transmitted over the line itself. This feature may be termed switching by pattern and may be explained by citing a specific example. When, for instance, the second toll trunk is seized at one end it is likewise seized at the other end and since the pattern of connections at each end are the same, then as the fourth trunk at one end is readied for toll service, the fourth trunk at the distant end is likewise readied for toll service. No signal has been transmitted over this fourth trunk but the switching at each end has nevertheless been effected simultaneously.

Another feature of the invention is a switching pattern whereby associated individual switching means at the opposite ends of a channel are simultaneously operated over a second channel and under control of the switching means of a third channel. The principle of this feature may be incorporated in a great many different specific applications, and is economically desirable, particularly in sparsely settled areas where the elaborate switching arrangements of closely grouped offices of the great metropolitan centers are not justified. The switching pattern is essentially a means whereby simple channels may be variously employed for alternative services and whereby the two ends of each channel may be simultaneously switched from one to another of these services by means other than the channel itself.

Other features will appear hereinafter.

The drawings consist of ten sheets having fifteen figures, as follows.

THE SWITCHING ARRANGEMENT

Figure 1:
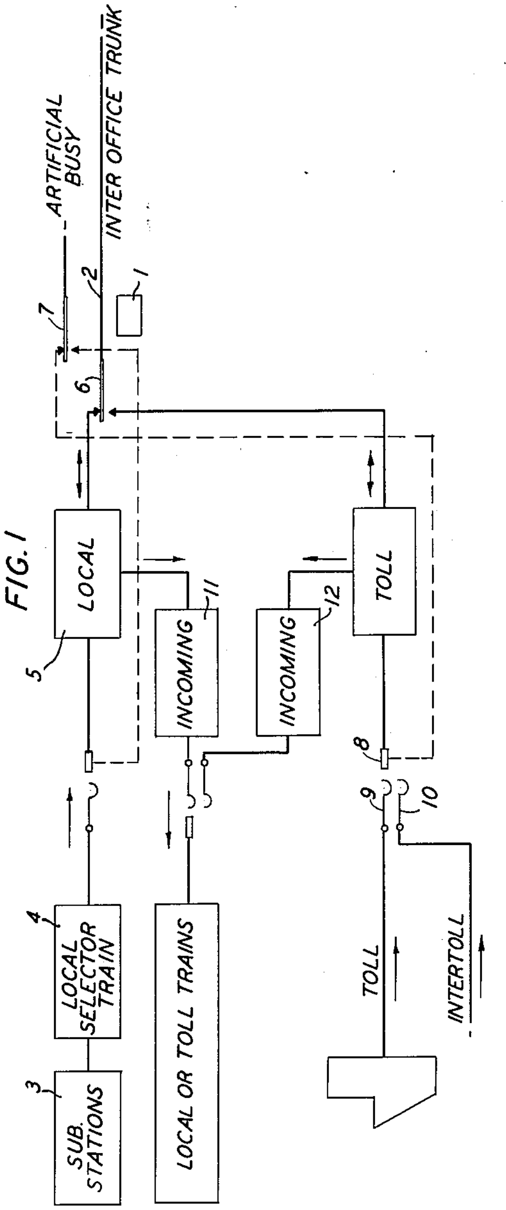
Fig. 1 is a block diagram indicating the use of a switching means at one end of an interoffice trunk, identical with another such means at the other end thereof, for controlling the alternative use of an interoffice trunk in either local or toll service.

Fig. 1 shows a schematic arrangement at one end of an interoffice trunk which is duplicated at the other end thereof. Each such trunk is provided with a switching relay 1, which in its normal position arranges the interoffice trunk 2 for local service but when operated switches the interoffice trunk 2 to toll service. Thus there is represented a subscriber's station 3, capable of extending a connection by a local selector train 4 toward the local circuit arrangement 5, over back contacts 6 of the relay 1 to the interoffice trunk 2 and thence over an incoming selector at the far end to further extend the connection in any desired direction. While the relay 1 is released to its normal condition an artificial busy condition is placed by armature 7 of this relay on the appearance of this trunk in the selector banks 8 accessible to toll trains of selector switches 9 or 10.

Figure 3:
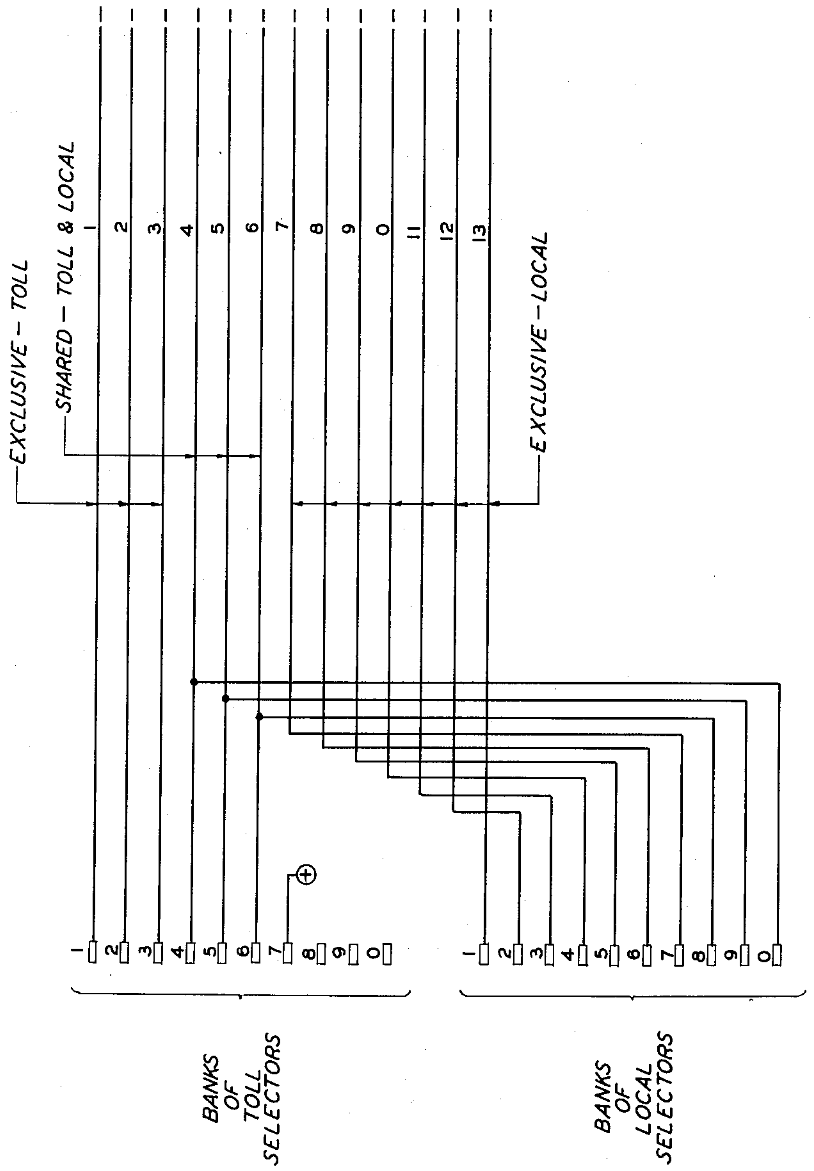
Fig. 3 is a schematic diagram showing how a total of a sum of exclusive and shared toll trunks plus a sum of exclusive and shared local trunks may be served by a lesser number of interoffice trunks.

The interoffice trunks are arranged in order, a certain number first in order being reserved for the exclusive use in toll service and others being shared in both toll and local service. A conventional means for having these trunks taken for service in order is employed so that those trunks reserved for exclusive service are first taken in order and the shared trunks are only used as a last resort. Fig. 3 is a schematic diagram showing how thirteen trunks are used for toll and local service, trunks 1 to 6 inclusive appearing on terminals 1 to 6 respectively in the banks of toll selectors and trunks 4 to 13 inclusive appearing in reverse order on terminals 1 to 10 respectively in the banks of local selectors. In both cases the last three trunks are shared trunks and since the automatic trunk hunting arrangement is such that trunk selection is made in the order of appearance, these shared trunks will be the last to be selected.

A feature of the invention is that the shared trunks appearing in the banks of the local selectors are normally connected for local service and are artificially marked busy in the toll selector banks. However, when a certain number of the exclusive toll trunks have come into use the first of the shared trunks is made ready for toll service and marked as busy in the local switch banks. As shown, by way of example, when number 2 (exclusive toll service trunk) is taken for use, number 4 (shared trunk) is readied for toll service and when number 3 is taken for use number 5 is readied.

If in the operation of this system a trunk which is to be prepared for toll service is actually being used in local service, then the switching relay will be prevented from operating and the local connecion will be left undisturbed. However, the instant such trunk is released the said switching relay will operate and the trunk will be readied for toll service.

Figure 2:
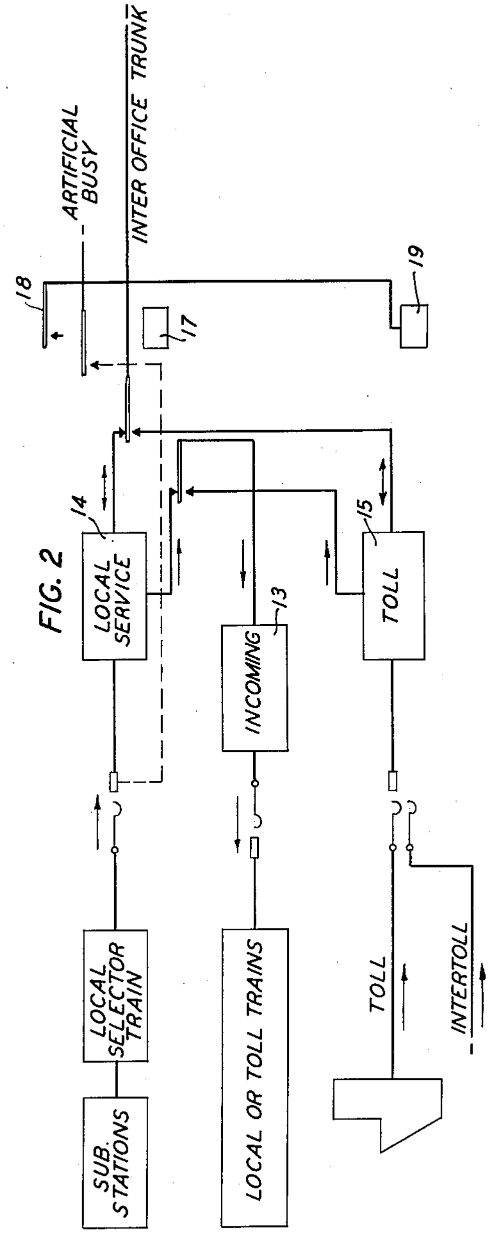
Fig. 2 is a similar block diagram indicating the use of a common incoming selector where the toll and local terminal circuit arrangements may properly operate such a common switch.

Now, going back again to Fig. 1, it will be noted that there is an incoming selector 11 accessible over the local circuit arrangement and an incoming selector 12 accessible over the toll circuit arrangement and that both these incoming selectors may be used for establishing connections over either local or toll switching trains. Fig. 2 shows a single incoming selector used in common by both the local circuit 14 and the toll service circuit 15. This is possible by the use of relay contacts 16 also controlled by the relay 17 (corresponding in function to the relay 1). In this Fig. 2 a contact arrangement 18 is indicated for operating a relay 19 of a next or later in order trunk. The circuit details of this arrangement will appear hereinafter.

Figure 4:
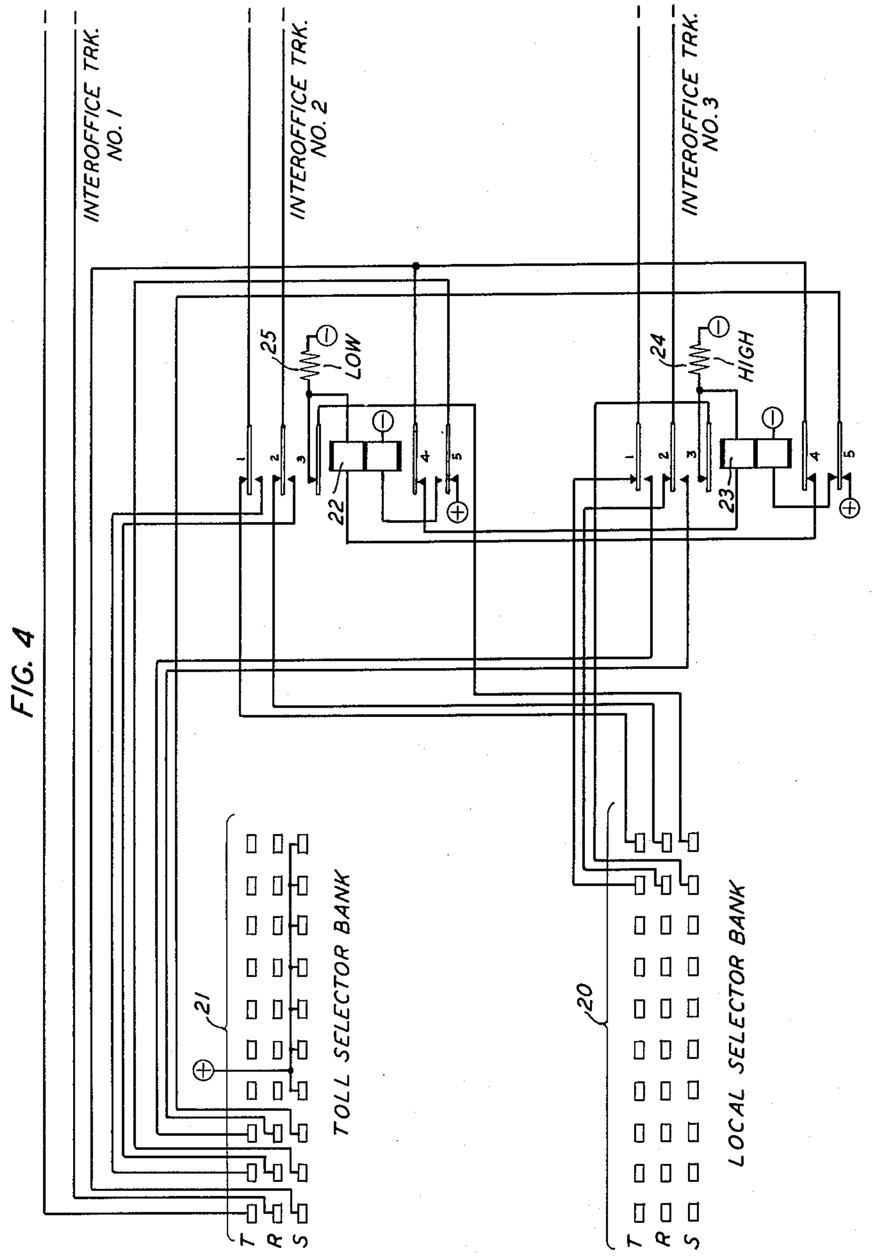
Fig. 4 is a schematic circuit diagram showing one very simple arrangement of means for switching the shared trunks.

Fig. 4 shows a simple type of pattern switching arrangement. The tenth local line connected to the local selector bank 20 leads over the back contacts and armatures 1 and 2 of the relay 22 to the interoffice trunk number 2 and the ninth local line from this bank leads over the back contacts and armatures 1 and 2 of the relay 23 to the interoffice trunk number 3.

The first line connected to the toll selector bank 21 leads directly over the interoffice trunk number one, the second line over front contacts and armatures 1 and 2 to the interoffice trunk number 2 and the third line over front contacts and armatures 1 and 2 to the interoffice trunk number 3.

If, before any line in the toll selector bank 21 has been seized, then either the ninth local line or the tenth local line in the local selector bank may be seized and extended over the interoffice trunk number 3 or the interoffice trunk number 2 respectively, while relay 23 or relay 22 respectively is in its normal position as shown. If the ninth local line is thus seized, the ground on the sleeve thereof is extended to armature 3 of relay 23 where it places a ground on the upper winding of relay 23 to prevent the operation of this relay by the seizure of the line connected to the first set of terminals in the toll selector bank 21. This renders the battery connection through the resistance 24 ineffective. Likewise if the tenth local line is thus seized, ground placed on armature three of relay 22 will prevent the operation thereof under similar conditions. Therefore, if both the ninth and tenth local lines are in use when the first toll line is seized neither relay 22 nor 23 will be operated and the sleeves of the second and third lines in the toll selector bank will remain grounded at the back contact and armature 5 of relays 22 and 23 respectively. While interoffice trunk number 1 is in use the tenth local line should be released then ground on armature 3 of relay 22 will be removed and this relay will immediately be operated from ground on the sleeve terminal of the first line in the toll selector bank, armature 4 and back contact of relay 23, the upper winding of relay 22, resistor 25 to battery.

Relay 22 operates and remains operated as long as interoffice trunk number 1 is held. The operation of this relay now places a ground on the sleeve of the tenth local line to prevent the use of the interoffice trunk number 2 while this trunk is held in reserve for toll service and at the same time it releases the busy marking condition on the second line in the toll selector bank.

If, while this condition obtains, the second toll line is seized relay 22 is locked through its lower winding and armature 5 so that it will not be released when and if the first line in the toll selector bank is released.

If both the ninth and tenth local lines are free and the first toll line is seized, then ground on the sleeve thereof will be extended in parallel to armature 4 of both relays 22 and 23, over the back contact of relay 23 to the upper winding of relay 22 and likewise over the back contact of relay 22 to the upper winding of relay 23. This tends to operate both relays but since the resistance 24 is comparatively higher than resistance 25, the relay 23 will be slower to operate and relay 22 will succeed in operating first and thereby opening the circuit of relay 23. Thus relay 22 will operate and render the interoffice trunk number 2 available to toll service and unavailable to local service.

If, when the first toll line is seized, relay 22 is prevented from operation by virtue of a ground on its armature 3 through the use of the tenth local line, then relay 23 will be operated so as to render the interoffice trunk number 3 available for toll service over the third line in the toll selector bank. With this arrangement there will be two interoffice trunks available for toll use, interoffice trunk number 1 and either interoffice trunk number 2 or interoffice trunk number 3. The number 2 trunk will be the most frequently used because the relay 23 only becomes operated under the above noted circumstances, that is when the first trunk in the toll selector bank is seized during the time the tenth line in the local selector bank is in use.

Figure 5:
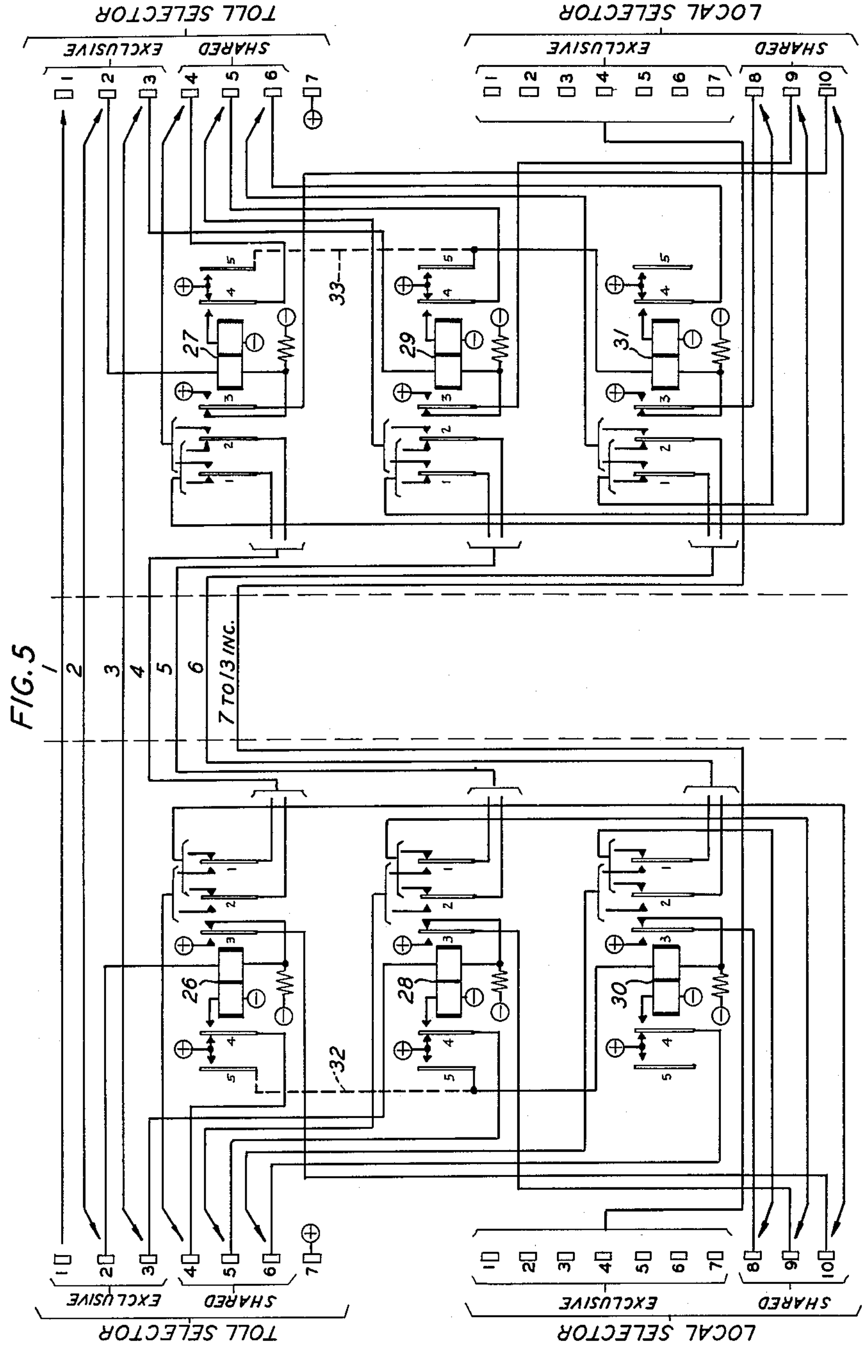
Fig. 5 is a similar schematic circuit diagram showing a circuit network for switching the shared trunks in a pattern such as that indicated in Fig. 3.

Fig. 5 is another and similar arrangement wherein six interoffice trunks are available for toll service, three as exclusive and the next three shared in accordance with the pattern indicated in Fig. 3. In this case the banks of the toll and local selectors are indicated by the connections to the sleeve or control terminals whereas the tip and ring or talking conductors are merely indicated by arrowheaded lines pointing to these sleeve terminals. This figure is intended to indicate the similarity of the arrangements at the distant ends of the interoffice trunks and to demonstrate the method of pattern switching whereby the two ends of any one trunk are simultaneously switched by signals transmitted otherwise than over the trunk itself.

It will be noted that the first three or exclusive toll lines are permanently associated with the first three interoffice trunks. When the second of these exclusive trunks is seized for use relay 26 at one end is operated to render the fourth interoffice trunk available to toll service. It will be seen hereinafter that the ground on the sleeve of this second trunk is relayed to the distant end of the trunk and there applied to the sleeve or control terminal whereby the relay 27 is operated substantially simultaneously with the relay 26.

Likewise when the third set of terminals in the toll selector bank at either end of the trunk is seized then relays 28 and 29 are simultaneously operated and the fifth trunk accessible over the toll selector banks is rendered available to toll service.

Again, upon the operation of the relays 28 and 29, the relays 30 and 31 respectively will be immediately operated, so that upon the appropriation of the third trunk accessible over the toll selectors the sixth trunk as well as the fifth will be rendered available for toll service. Thus on the appropriation of the second trunk, another, the fourth is rendered available whereas on the appropriation of the third trunk, two more, the fifth and the sixth are rendered available.

An alternative arrangement is indicated in Fig. 5. Jumpers 32 and 33 may be wired in if the traffic conditions warrant it. With these connections made, then either the operation of relay 26 or 28 will cause the operation of relay 30 and simultaneously therewith either the operation of relay 27 or 29 will cause the operation of relay 31. By this arrangement, when the second trunk accessible over the toll selector banks is seized then trunks four, five and six will be rendered available for toll service. However, if relay 26 is prevented from operation by the use of the tenth local trunk then no one of these three trunks will be enabled for toll service. Nevertheless, the third trunk is still available so that when this is seized relay 28 and consequently relay 30 will be operated and the fifth and sixth trunks will be rendered available for toll service. If when the second trunk is seized, the ninth local trunk is in use, then relay 28 will not operate but both relays 26 and 30 will operate and the fourth and sixth trunks will be rendered available for toll service.

It is believed that other combinations will be apparent. It is also believed that it is clearly apparent that the pairs of relays such as relay 26 and relay 27 will always be operated together so that pattern switching not involving any signal over the trunk being switched can be accomplished.

Figure 6:
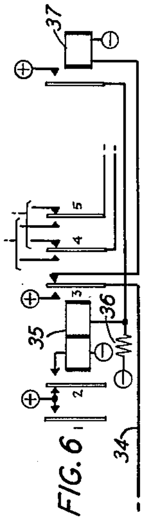
Fig. 6 is a fragmentary schematic circuit diagram showing an alternative arrangement which may be employed under certain given practical or commercial conditions.

Fig. 6 is what might be termed a thumbnail sketch to indicate an alternative arrangement where the current value on the sleeve or control terminals is critical or must be of a particular value. In this case the lead 34 from the sleeve of a local trunk instead of extending through the back contact and armature 3 of relay 35 to a point between the resistor 36 and the right hand winding of relay 35 extends instead to the winding of relay 37 and this relay in turn places a direct and firm ground on this junction point to prevent the operation of relay 35.

Looking again at Fig. 1 for a moment it may be noted that the circuit arrangements for local service (box 5) and for toll service may differ in many respects, but such differences are immaterial since the local type circuit at one end will always be matched by the local type circuit at the other end and, by the same token, the toll type circuit at one end will always be matched by the toll type circuit at the other end.

Where a single type of incoming switch will operate equally well with the two different local and toll circuit arrangements at the other end, then the arrangement of Fig. 2 may be employed.

It may also be noted that any type circuits may be employed such as two way trunks or one way trunks, completing line and recording trunks or trunks employing simplex or composite circuits. The interoffice trunks are indicated as being of the two wire type but the invention may as well be employed for switching communication channels having a larger number of conductors, the switching relays being provided with a corresponding complement of transfer contacts.

CIRCUIT DETAILS

*Two way toll trunk*

In the following examples of detailed circuits suitable for working by the means of the present invention several points should be noted. The designating numerals will each be a combination of the figure number and a local number, each relay will control all the armatures vertically aligned therewith, and only so much of the operation of the circuit will be described as is necessary to an understanding of the present invention. The two way trunk circuit of Fig. 12 is exactly the same as that of Fig. 13, one being a mirrored reproduction of the other.

Figure 7:
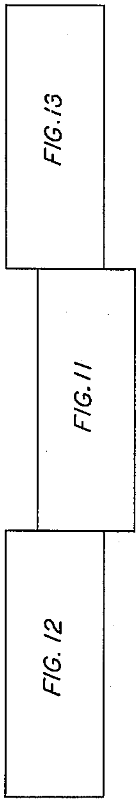
Fig. 7 is a block diagram showing how Figs. 11, 12 and 13 may be placed to show a two way trunk circuit permanently connected to an interoffice trunk and of a type suitable for toll working.
Figure 8:
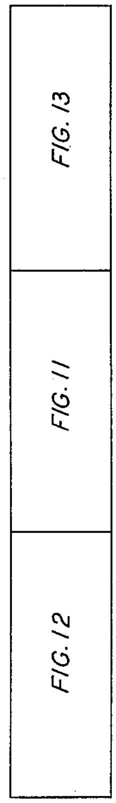
Fig. 8 is a similar block diagram showing how Figs. 11, 12 and 13 may be placed to show the same kind of connection but this time including a shared interoffice trunk.
Figure 11:
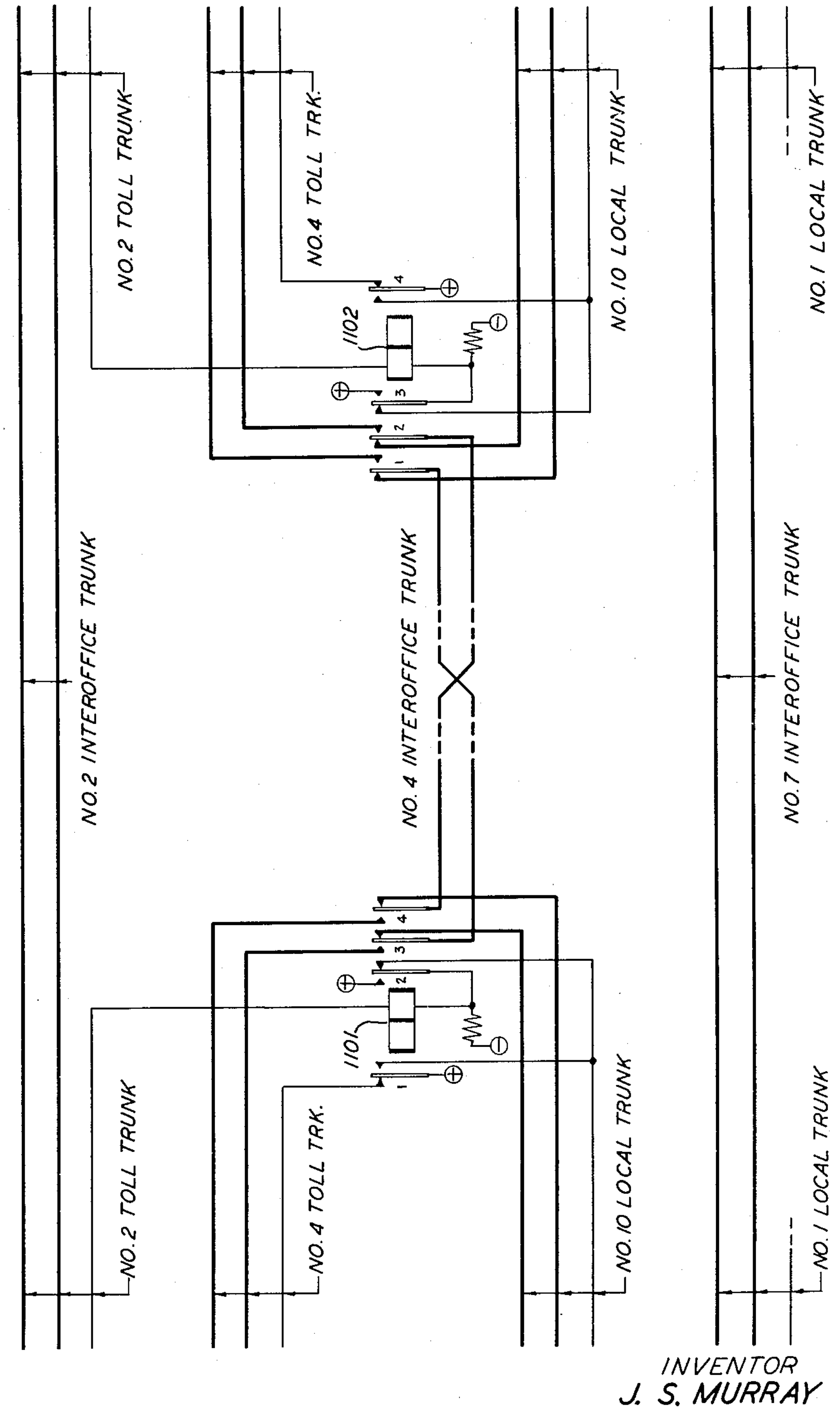
Fig. 11 is a schematic circuit diagram showing the switching means employed at the distant ends of a shared interoffice trunk.

Each terminal arrangement of the two way trunk has an appearance in the bank terminals of a toll selector by which it may be seized over any conventional route, as from a subscriber's station, a toll board or from an intertoll trunk. The circuit also leads to an incoming switch by means of which a circuit may be extended over any conventional route, as to a local subscriber's station, a toll board or an intertoll trunk. Each circuit also has a connection to an interoffice trunk. In this example the interoffice trunk is a two wire channel as indicated in Fig. 11 when the drawings are placed as indicated in Fig. 7. A conventional simplex circuit is used.

When this circuit is seized over the terminals in the toll selector bank a conventional low resistance shunt will be placed across the tip and ring so that the CB relay 1201 will be operated in a circuit from ground (the plus terminal of the battery) the upper winding of the CB relay 1201, the back contact and armature 1 of the RD–2 relay 1202, upper left winding of repeating coil 1203, tip conductor, armature 1 and back contact of the SR–11 relay 1204, the tip selector bank contact over the bridge provided in the circuit over which this trunk has been seized, the ring selector bank contact, back contact and armature 2 of the SR–11 relay 1204, lower left winding of repeating coil 1203, armature 2 and back contact of the RD–2 relay 1202 and the lower winding of the CB relay 1201. The CB relay causes the sleeve conductor 1205 at this end and the sleeve conductor 1305 at the other end to become grounded to simultaneously operate the two switching relays 1101 and 1102.

Figure 12:
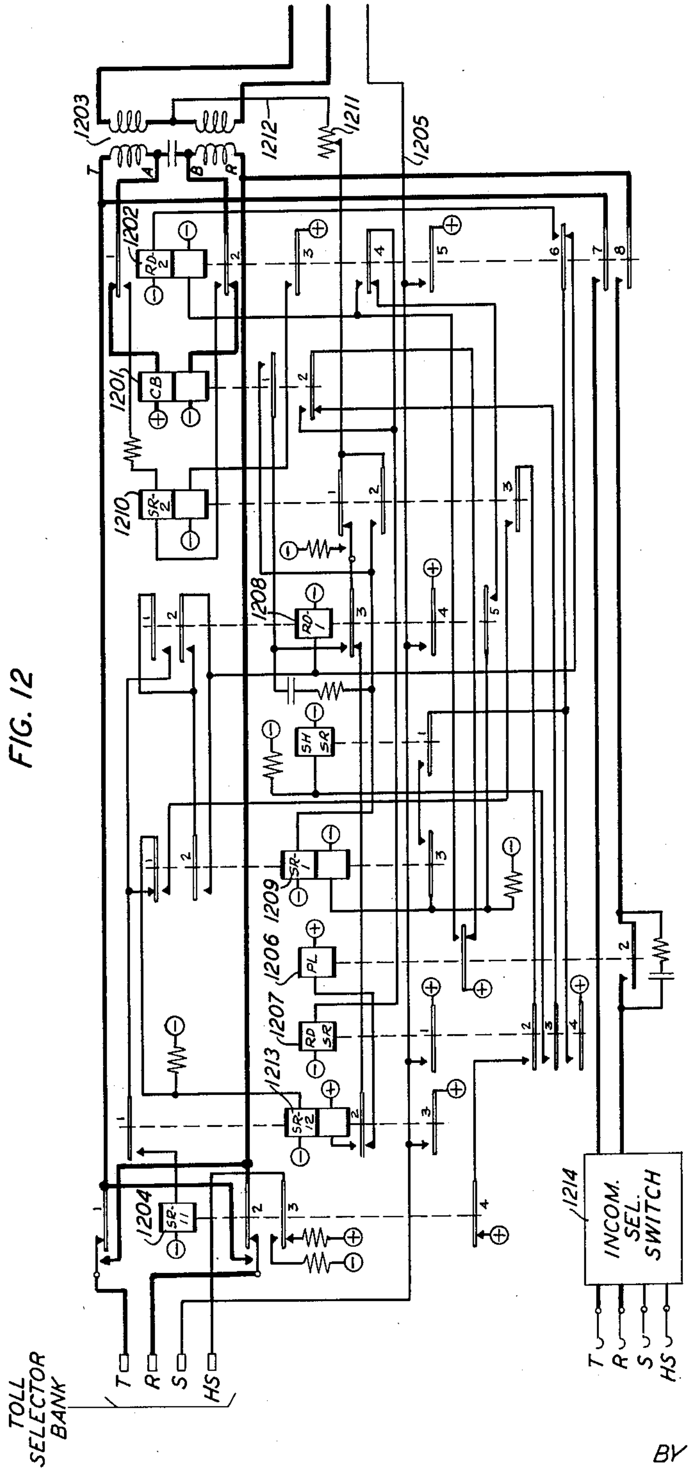
Fig. 12 is a schematic circuit diagram showing the circuit arrangement of one end of a two way toll trunk.
Figure 13:
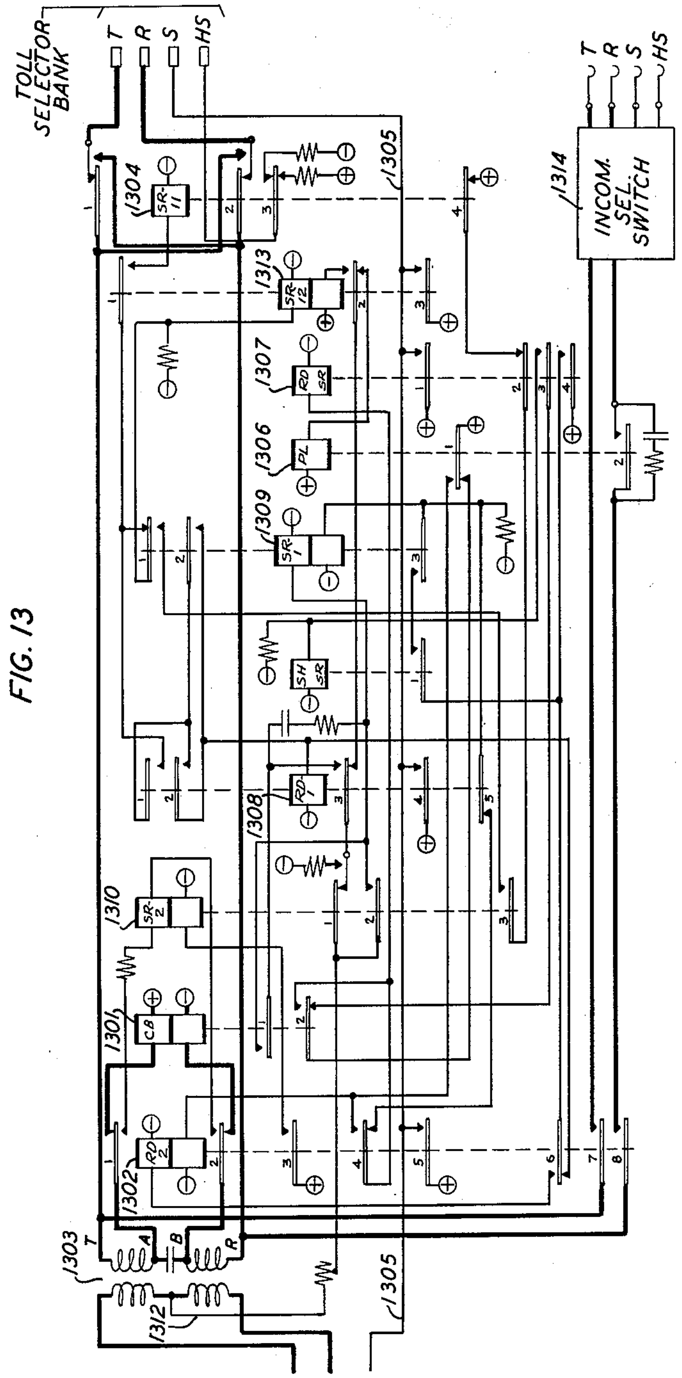
Fig. 13 is a mirrored reproduction of Fig. 12.

At the Fig. 12 end the operation of the CB relay 1201 establishes a circuit from ground, armature 1 and back contact of the PL relay 1206, armature 2 and front contact of the CB relay 1201, the winding of the RD slow releasing relay 1207 to battery. The RD relay operates and through its armature 1 and front contact applies ground to the sleeve conductor 1205.

The RD relay also establishes a circuit from ground, armature 4 and front contact of the RD relay 1207, armature 6 and back contact of the RD–2 relay 1202, the winding of the RD–1 relay 1208 to battery to cause this relay to operate. Thereupon a circuit is established from battery, upper winding of the SR–1 relay 1209, front contact and armature 1 of the CB relay 1201, front contact and armature 3 of the RD–1 relay 1208, back contact and armature 1 of the SR–2 relay 1210, the adjustable resistor 1211, the simplex leg 1212, the distant end simplex leg 1312, the adjustable resistor 1311, armature 1 and back contact of the SR–2 relay 1310, armature 3 and back contact of the RD–1 relay 1308, armature 2 and back contact of the SR–12 relay 1313, and the winding of the PL relay 1306 to ground. The PL relay 1306 operates and through its armature 1 and front contact operates the RD–2 relay 1302 through its lower winding. The RD–2 relay grounds the sleeve conductor 1305 through its armature 5 and front contact, cuts off the CB relay 1301 and connects the incoming selector 1314 to the tip and ring conductors. The low resistance upper winding of the SR–2 relay 1310 is bridged across the channel to the incoming switch and the PL relay 1306 at its armature 2 and front contact closes the dialing circuit for the incoming switch.

It is believed that this description is sufficient to show how such a two way trunk when seized will simultaneously ground the sleeve conductors at the distant end of the trunk. When the arrangement of Fig. 7 is used, where these two ends are permanently connected over the number 2 interoffice trunk this will result in the simultaneous operation of the two switching relays 1101 and 1102 whereby the number 4 toll trunk is switched to the number 4 interoffice trunk and so becomes available for service. Before the operation of the switching relay 1101 the sleeve conductor 1205 of the toll two way switching trunk will be grounded over the armature 1 and back contact of the relay 1101 and similarly the sleeve conductor 1305 will be grounded by the armature 4 and back contact of the switching relay 1102. Upon the operation of these two relays as just described, the grounds will be removed from the sleeve circuits of this two way trunk now rendered available for service and ground will be placed on the sleeves of the number 10 local trunk, as clearly indicated in Fig. 11.

*Two way local trunk*

Figure 9:
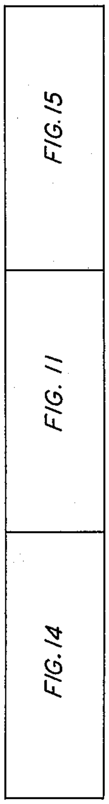
Fig. 9 is a block diagram showing how Figs. 11, 14 and 15 may be placed to show a two way trunk circuit connected by way of a shared interoffice trunk and of a type suitable for local working.
Figure 10:
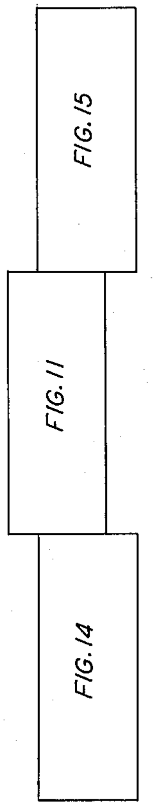
Fig. 10 is a similar block diagram showing how Figs. 11, 14 and 15 may be placed to show the terminal circuit arrangements of a local type two way trunk joined by an exclusive interoffice trunk.
Figure 14:
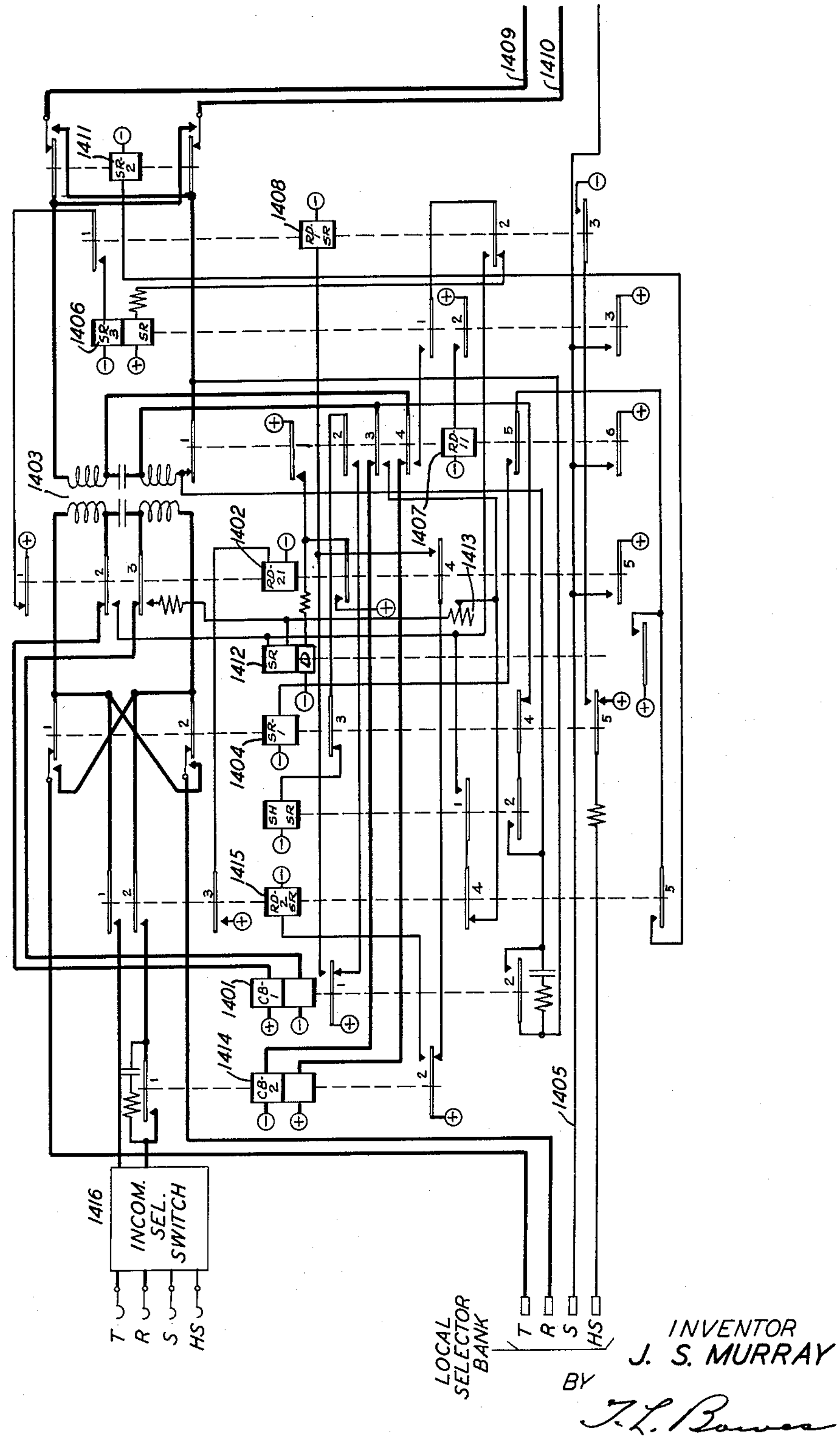
Fig. 14 is a schematic circuit diagram showing the circuit arrangement of one end of a two way local trunk.
Figure 15:
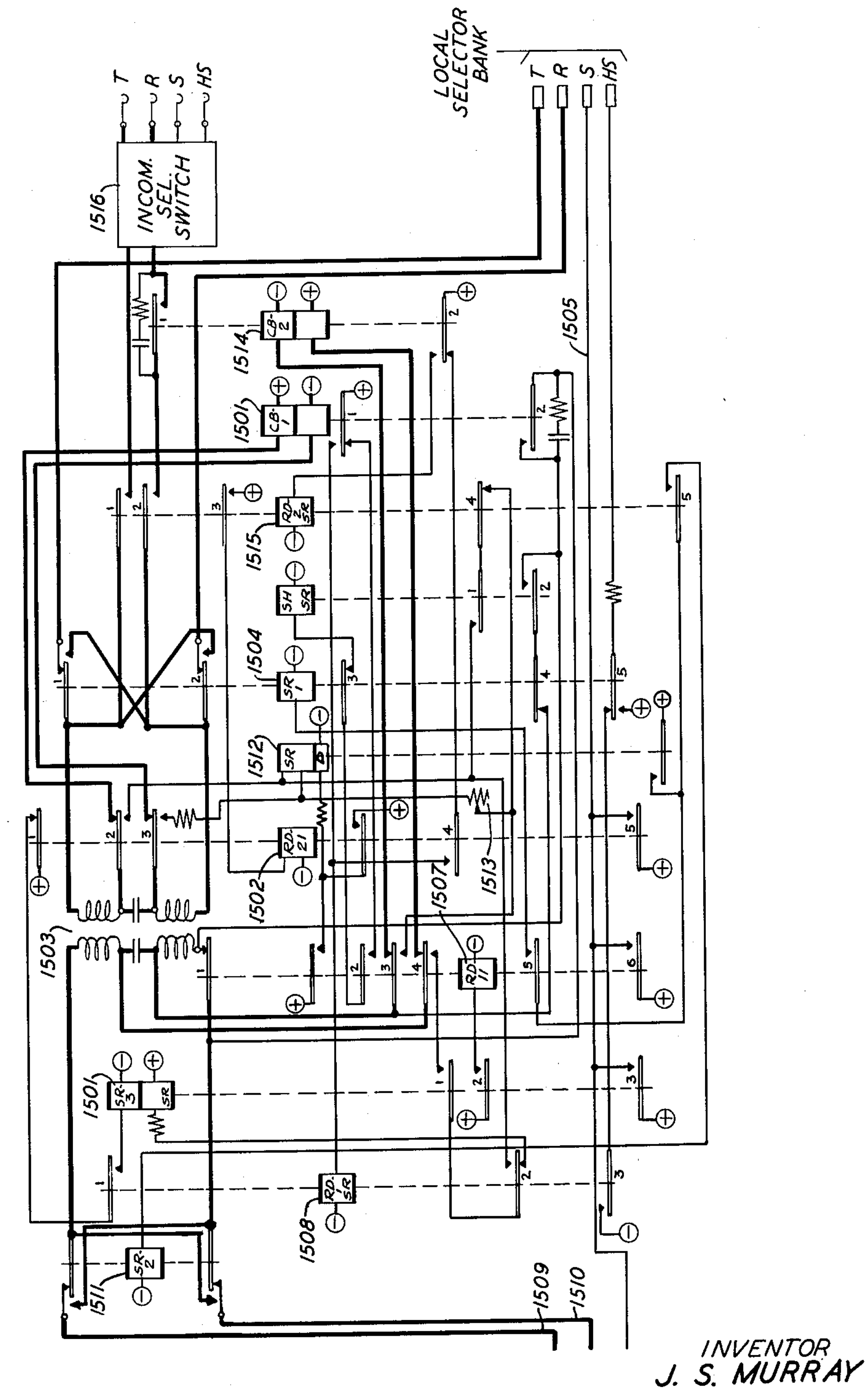
Fig. 15 is a mirrored reproduction of Fig. 14.

Each terminal arrangement of the two way trunk has an appearance in the bank terminals of a local selector by which it may be seized over any conventional route as from a subscriber's station, a local operator's board or from an incoming selector. The circuit also leads to an incoming selector switch by means of which a circuit may be extended over any conventional route, as to a local subscriber's station or an operator's board. Each circuit also has a connection to an interoffice trunk. In this example the interoffice trunk is a two wire channel, as indicated in Fig. 11 when the drawings are placed as indicated in either Fig. 9 or 10. When the drawings are placed as indicated in Fig. 9, then the two way trunk will be used as a shared trunk and will include as part thereof the number 4 interoffice trunk. When connected in a circuit indicated by Fig. 10, the two way trunk will be an exclusive local trunk. When the trunk circuit of Fig. 14 is seized by a local selector, then a circuit will be established from ground, the upper winding of the CB–1 relay 1401, back contact and armature 2 of the RD–21 relay 1402, the upper left winding of repeating coil 1403, tip conductor, armature 1 and back contact of the SR–1 relay 1404, the tip terminal in the local selector bank and thence back through a conventional bridge circuit to the ring terminal in the local selector bank, the back contact and armature 2 of the SR–1 relay 1404, lower left winding of repeating coil 1403, armature 3 and back contact of the RD–21 relay 1402 and the lower winding of the CB–1 relay 1401 to battery. The CB–1 relay operates and causes ground to be placed on the local sleeve 1405 and the distant sleeve conductor 1505.

At the local end, the operation of the CB–1 relay 1401 extends ground from its armature 1 and front contact to the winding of the RD–1 relay 1408 to ground so that this relay now becomes operated. The operation of this relay establishes a connection from ground, armature 1 and back contact of the RD–21 relay 1402, armature 1 and front contact of the RD–1 relay 1408, upper winding of the SR–3 slow releasing relay 1406 to battery. This relay operates and through its armature 3 and front contact places a ground on the sleeve conductor 1405.

A circuit is now established from ground, armature 2 and front contact of the SR–3 relay 1406, the winding of the RD–11 relay 1407 to battery. The RD–11 relay in operating, effectively places a shunt on the channel consisting of the two wires 1409 and 1410 which may be traced from the tip conductor 1409, the back contact and armature 1 of the SR–2 relay 1411, the upper right hand winding of the repeating coil 1403, armature 5 and front contact of the RD–11 relay 1407, front contact and armature 1 of the SR–3 relay 1406, armature 2 and front contact of the RD–1 relay 1408, lower winding of the SR relay 1412, adjustable resistance 1413, front contact and armature 4 of the RD–11 relay 1407, lower right winding of the repeating coil 1403, front contact and armature 2 of the CB–1 relay 1401, armature 2 and back contact of the SR–2 relay 1411 to the ring conductor 1410. At the distant end, this shunt provided by the lower low resistance winding of the SR relay 1412 is effectively placed across the tip and ring conductors 1509 and 1510 and may then be traced through the back contact and armature 1 of the SR–2 relay 1511, the upper left winding of repeating coil 1503, armature 5 and back contact of the RD–11 relay 1507, upper winding of the CB–2 relay 1514 to ground and, by the same token, from the ring conductor 1410 through the back contact and armature 2 of the SR–2 relay 1511, armature 1 and back contact of the RD–11 relay 1507, lower left winding of repeating coil 1503, armature 4 and back contact of the RD–11 relay 1507, the lower winding of the CB–2 relay 1514 to battery. The CB–2 relay is thus energized at the distant end and by means of its armature 2 and front contact causes the operation of the RD–2 relay 1515. This relay, in turn, through its front contact and armature 3 causes the operation of the RD–21 relay 1502 so that through the armature 5 and front contact of this last named relay, ground is placed on the sleeve conductor 1505. Thus it will be seen that when the local trunk line is seized in the local selector bank that the local CB–1 relay is operated to place ground on the sleeve locally and that this in turn will cause the operation of the distant CB–2 relay which likewise places ground on the sleeve at that point. The armature 2 and front contact of the CB–1 relay constitute a dialing means for operating the distant CB–2 relay. When the distanct CB–2 relay 1515 is operated the RD–2 relay 1515 follows, and this connects the incoming selector switch 1516 to the repeating coil 1503 and includes the armature 1 and front contact of the CB–2 relay 1514 to repeat the dial pulses into such incoming selector switch.

It is believed that further explanation of this circuit is unnecessary as it is plain that the seizure at either ends will cause ground to be placed on the sleeves at both ends and thus cause the simultaneous application to the armature 2 of a relay such as 1101 and armature 3 of a relay such as 1102 to prevent the operation of these switching relays when a toll trunk such as the number 2 toll trunk is appropriated. By this means when a local trunk such as the number 10 local trunk is available for local use and is seized then its continued use will remain undisturbed until the use has been completed and ground is removed from the sleeves of the terminating circuit arrangements.

What is claimed is:

1. In a telecommunication system, a plurality of interoffice trunks, control interconnections between said trunks, consisting of means whereby a given one of said trunks may exercise control over another given one of said trunks, said interconnections being arranged in accordance with a predetermined pattern, terminal circuit arrangements for each of said trunks for adapting said trunks to a first class of service, terminal circuit arrangements for each of said trunks for adapting said trunks to a second class of service, terminal switching means for changing each said trunk from one class of service to another and pattern controlled means independent of a given one of said trunks for simultaneously operating said switching means at the two terminals of said given one of said trunks.

2. In a telecommunication system, a plurality of interoffice trunks, a plurality of circuit networks for each end of each of said trunks, switching means at each end of each of said trunks for simultaneously switching the two ends of a said trunk from one set of said networks to another set of said networks, and means controlled over a given one of said trunks for controlling the said switching means individual to another of said trunks.

3. In a telecommunication system, a plurality of interoffice trunks, a plurality of circuit networks for each end of each of said trunks, switching means at each end of each of said trunks for simultaneously switching the two ends of a given one of said trunks from one set of said networks to another set of said networks, and a predetermined pattern of means independent of each said trunk for operating the said switching means thereof.

4. In a telecommunication system, a plurality of telecommunication channels, a plurality of connecting circuits for each said channel at each end thereof, a switching means individual to each said channel at each end thereof for switching the interconnection of said channel and its said connecting circuits, each said channel being associated with another of said channels and means for operating said individual switching means of a given one of said channels over its said associated channel.

5. In a telecommunication system, a plurality of telecommunication channels, a plurality of connecting circuits for each said channel at each end thereof, a switching means individual to each said channel at each end thereof for switching the interconnection of said channel and its said connecting circuits, each said channel being associated with others of said channels in a predetermined pattern and means for operating said individual switching means of a third one of said channels controlled by said switching means of a second one of said channels and by a first one of said channels.

6. In a telecommunication system where a plurality of interoffice trunks is provided and where said trunks are arranged in three groups, a first group for exclusive use in a paramount service, a second group for use in a subordinate service, and a third group for shared use in both said paramount service and said subordinate service, where directively operated switching means is employed for seizing said trunks and extending connections thereover, there being two groups of said switching means, one for use in a paramount service and another for use in a subordinate service, where the seizure of a trunk in said switching means is carried out by conventional means for testing said trunks in order and seizing the first available trunk encountered and wherein said trunks are arranged so that the said exclusive trunks are first in order and the said shared trunks are tested for availability only after no exclusive trunk is found to be available an arrangement characterized in this that means is provided to render said shared trunks normally unavailable in said paramount service switches and normally available in said subordinate service switches, and means responsive to the seizure of a given number of said exclusive paramount service trunks for rendering a given number of said shared trunks available in said paramount service switches.

7. In a telecommunication system where a plurality of interoffice trunks is provided and where said trunks are arranged in three groups, a first group for exclusive use in a paramount service, a second group for use in a subordinate service, and a third group for shared use in both said paramount service and said subordinate service, where directively operated switching means is employed for seizing said trunks and extending connections thereover, there being two groups of said switching means, one for use in a paramount service and another for use in a subordinate service, where the seizure of a trunk in said switching means is carried out by conventional means for testing said trunks in order and seizing the first available trunk encountered and wherein said trunks are arranged so that the said exclusive trunks are first in order and the said shared trunks are tested for availability only after no exclusive trunk is found to be available an arrangement characterized in this that means is provided to render said shared trunks normally unavailable in said paramount service switches and normally available in said subordinate service switches, and means responsive to the seizure of a particular one of said exclusive paramount service trunks for changing the said normal arrangement of a particular one of said shared trunks.

8. In a telecommunication system where a plurality of interoffice trunks is provided and where said trunks are arranged in three groups, a first group for exclusive use in a paramount service, a second group for use in a subordinate service, and a third group for shared use in both said paramount service and said subordinate service, where directively operated switching means is employed for seizing said trunks and extending connections thereover, there being two groups of said switching means, one for use in a paramount service and another for use in a subordinate service, where the seizure of a trunk in said switching means is carried out by conventional means for testing said trunks in order and seizing the first available trunk encountered and wherein said trunks are arranged so that the said exclusive trunks are first in order and the said shared trunks are tested for availability only after no exclusive trunk is found to be available an arrangement characterized in this that means is provided to render said shared trunks normally unavailable in said paramount service switches and normally available in said subordinate service switches, and a rearrangement circuit responsive to the seizure of said paramount service trunks in order and to varying extents for changing the said normal arrangement of said shared trunks to maintain a minimum number of trunks available for paramount service.

9. In a telecommunication system where a plurality of interoffice trunks is provided and where said trunks are arranged in three groups, a first group for exclusive use in a paramount service, a second group for use in a subordinate service, and a third group for shared use in both said paramount service and said subordinate service, where directively operated switching means is employed for seizing said trunks and extending connections thereover, there being two groups of said switching means, one for use in a paramount service and another for use in a subordinate service, where the seizure of a trunk in said switching means is carried out by conventional means for testing said trunks in order and seizing the first available trunk encountered and wherein said trunks are arranged so that the said exclusive trunks are first in order and the said shared trunks are tested for availability only after no exclusive trunk is found to be available an arrangement characterized in this that means including a source of busy potential is provided to normally make said shared trunks appear as busy in said paramount service switches, means responsive to the seizure of certain of said exclusive trunks for transferring said busy appearance of certain corresponding ones of said shared trunks from said exclusive service switches to said subordinate service switches.

10. In a telecommunication system where a plurality of interoffice trunks is provided and where said trunks are arranged in three groups, a first group for exclusive use in a paramount service, a second group for use in a subordinate service, and a third group for shared use in both said paramount service and said subordinate service, where directively operated switching means is employed for seizing said trunks and extending connectionse thereover, there being two groups of said switching means, one for use in a paramount service and another for use in a subordinate service, where the seizure of a trunk in said switching means is carried out by conventional means for testing said trunks in order and seizing the first available trunk encountered and wherein said trunks are arranged so that the said exclusive trunks are first in order and the said shared trunks are tested for availability only after no exclusive trunk is found to be available an arrangement characterized in this that means including a source of busy potential is provided to normally make said shared trunks appear as busy in said paramount service switches, means responsive to the seizure of certain of said exclusive trunks for transferring said busy appearance of certain corresponding ones of said shared trunks from said exclusive service switches to said subordinate service switches and means responsive to the prior seizure of any one of said shared trunks in said subordinate service switches for preventing the operation of its said transferring means.

11. In a telecommunication system where a plurality of interoffice trunks is provided and where said trunks are arranged in three groups, a first group for exclusive use in a paramount service, a second group for use in a subordinate service, and a third group for shared use in both said paramount service and said subordinate service, where directively operated switching means is employed for seizing said trunks and extending connections thereover, there being two groups of said switching means, one for use in a paramount service and another for use in a subordinate service, where the seizure of a trunk in said switching means is carried out by conventional means for testing said trunks in order and seizing the first available trunk encountered and wherein said trunks are arranged so that the said exclusive trunks are first in order and the said shared trunks are tested for availability only after no exclusive trunk is found to be available an arrangement characterized in this that said directively operated switches comprise an outgoing selector for seizure of said trunks and an incoming selector for extension of said trunks at each end of said trunks, said exclusive paramount service trunks having selectors and circuits therefor suitable for paramount service, said exclusive subordinate service trunks having selectors and circuits therefor suitable for subordinate service and said shared trunks having one set of selectors and circuits therefor suitable for paramount service and another set of selectors and circuits therefor suitable for subordinate service, said set of selectors and circuits therefor suitable for subordinate service of said shared trunks being normally enabled and switching means for each of said shared trunks responsive to the seizure of a particular one of said exclusive paramount service trunks for transferring the enablement of its said selectors and circuits therefor from its said set suitable for subordinate service to its said set suitable for paramount service.

12. In a telecommunication system where a plurality of interoffice trunks is provided and where said trunks are arranged in three groups, a first group for exclusive use in a paramount service, a second group for use in a subordinate service, and a third group for shared use in both said paramount service and said subordinate service, where directively operated switching means is employed for seizing said trunks and extending connections thereover, there being two groups of said switching means, one for use in a paramount service and another for use in a subordinate service, where the seizure of a trunk in said switching means is carried out by conventional means for testing said trunks in order and seizing the first available trunk encountered and wherein said trunks are arranged so that the said exclusive trunks are first in order and the said shared trunks are tested for availability only after no exclusive trunk is found to be available an arrangement characterized in this that said directively operated switches comprise an outgoing selector for seizure of said trunks and an incoming selector for extension of said trunks at each end of said trunks, said exclusive paramount service trunks having selectors and circuits therefor suitable for paramount service, said exclusive subordinate service trunks having selectors and circuits therefor suitable for subordinate service and said shared trunks having one set of selectors and circuits therefor suitable for paramount service and another set of selectors and circuits therefor suitable for subordinate service, said set of selectors and circuits therefor suitable for subordinate service of said shared trunks being normally enabled and switching means for each of said shared trunks responsive to the seizure of a particular one of said exclusive paramount service trunks for transferring the enablement of its said selectors and circuits therefor from its said set suitable for subordinate service to its said set suitable for paramount service and means responsive to the seizure of a particular one of said exclusive paramount service trunks at either end thereof to simultaneously operate the said switching means at both ends of a particular one of said shared trunks.

References Cited in the file of this patent

UNITED STATES PATENTS

| | | |
|---|---|---|
| 2,391,389 | Burgener | Dec. 25, 1945 |
| 2,421,919 | Avery | June 10, 1947 |
| 2,635,147 | Stehlik | Apr. 14, 1953 |